United States Patent
Tokunaga et al.

(10) Patent No.: US 9,618,333 B2
(45) Date of Patent: Apr. 11, 2017

(54) CLEARANCE MEASUREMENT DEVICE AND CLEARANCE MEASUREMENT METHOD FOR COMBUSTOR

(71) Applicant: MITSUBISHI HITACHI POWER SYSTEMS, LTD., Kanagawa (JP)

(72) Inventors: Yugo Tokunaga, Tokyo (JP); Kenta Taniguchi, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 246 days.

(21) Appl. No.: 14/418,228

(22) PCT Filed: Sep. 6, 2013

(86) PCT No.: PCT/JP2013/074027
§ 371 (c)(1),
(2) Date: Jan. 29, 2015

(87) PCT Pub. No.: WO2014/045896
PCT Pub. Date: Mar. 27, 2014

(65) Prior Publication Data
US 2015/0204656 A1     Jul. 23, 2015

(30) Foreign Application Priority Data
Sep. 24, 2012 (JP) .................... 2012-209524

(51) Int. Cl.
*G01C 3/08* (2006.01)
*G01B 11/14* (2006.01)
(Continued)

(52) U.S. Cl.
CPC .............. *G01B 11/14* (2013.01); *F02C 7/00* (2013.01); *F23R 3/10* (2013.01); *F23R 3/283* (2013.01);
(Continued)

(58) Field of Classification Search
CPC .... F23R 3/10; F23R 3/46; F23R 3/283; F23R 3/42; F23R 2900/00017; F23R 2900/00019; F02C 7/00; F05D 2260/80; F05D 2260/83
(Continued)

(56) References Cited

U.S. PATENT DOCUMENTS 8,786,848 B2 * 7/2014 Hatcher .................. F01D 9/023
348/83
2003/0037549 A1 2/2003 Mandai et al.
(Continued)

FOREIGN PATENT DOCUMENTS

CN      1403745      3/2003
EP      1 216 796    6/2002
(Continued)

OTHER PUBLICATIONS

First Office Action issued Sep. 6, 2015 in corresponding Chinese Application No. 201380039325.4 (with English translation).
(Continued)

*Primary Examiner* — Mark Hellner
(74) *Attorney, Agent, or Firm* — Wenderoth, Lind & Ponack, L.L.P.

(57) ABSTRACT

A clearance measurement device for a combustor includes: a rod part with the hollow base end side which is mounted on a first flange of the combustor while being inserted in the combustor; a support part which is mounted at the leading end of the rod part so as to be rotatable around an axis perpendicular to the axial direction of the rod part; an imaging element which is supported by the support part and images an annular clearance; an operation lever which penetrates the inside of the rod part and extends toward the support part; and a link mechanism which is provided between the operation lever and the support part and con-
(Continued)

verts a forward/backward motion of the operation lever into a rotary motion of the support part around the axis.

9 Claims, 8 Drawing Sheets

(51) Int. Cl.
    *F23R 3/10*     (2006.01)
    *F23R 3/46*     (2006.01)
    *F23R 3/42*     (2006.01)
    *F02C 7/00*     (2006.01)
    *F23R 3/28*     (2006.01)

(52) U.S. Cl.
    CPC .................. *F23R 3/42* (2013.01); *F23R 3/46* (2013.01); *F05D 2260/80* (2013.01); *F05D 2260/83* (2013.01); *F23R 2900/00017* (2013.01); *F23R 2900/00019* (2013.01)

(58) Field of Classification Search
    USPC ........................................................ 356/4.01
    See application file for complete search history.

(56) References Cited

U.S. PATENT DOCUMENTS

| | | | |
|---|---|---|---|
| 2005/0073673 A1* | 4/2005 | Devitt | .................. F01D 21/003 356/37 |
| 2010/0225902 A1 | 9/2010 | Bagley et al. | |
| 2012/0312103 A1* | 12/2012 | Hannott | ............... A61B 1/0056 73/865.8 |

FOREIGN PATENT DOCUMENTS

| | | |
|---|---|---|
| JP | 3-107705 | 5/1991 |
| JP | 9-236545 | 9/1997 |
| JP | 2002-264050 | 9/2002 |
| JP | 2003-501577 | 1/2003 |
| JP | 2007-232350 | 9/2007 |
| JP | 2008-96066 | 4/2008 |
| JP | 2009-19590 | 1/2009 |

OTHER PUBLICATIONS

Notice of Allowance issued Apr. 26, 2016 in corresponding Chinese Application No. 201380039325.4, with English translation.
Decision to Grant a Patent issued May 6, 2016 in corresponding Japanese Application No. 2012-209524, with English translation.
Notice of Allowance issued Jul. 19, 2016 in corresponding Korean Application No. 10-2015-7002290 (with English translation).
International Preliminary Report on Patentability, issued Apr. 2, 2015, in International Application No. PCT/JP2013/074027 (with English Translation).
International Search Report issued Oct. 1, 2013, in International Application No. PCT/JP2013/074027.

* cited by examiner

VIEW ALONG LINE B-B

AXIAL DIRECTION OF ROD PART

CLEARANCE MEASUREMENT DEVICE AND CLEARANCE MEASUREMENT METHOD FOR COMBUSTOR

TECHNICAL FIELD

The present invention relates to a clearance measurement device and a clearance measurement method for a combustor.

BACKGROUND ART

Conventionally, gas turbine combustors of various configurations are known.

A typical configuration of a gas turbine combustor includes a pilot nozzle, multiple main nozzles disposed at regular intervals on the outer circumference of the pilot nozzle, and a main burner installed so as to cover the downstream-side leading end portions of the main nozzles. A combustor swirler shell, which is installed on a fuel supply side, is connected with a combustion liner for guiding combustion gas to a downstream turbine. There is an annular clearance formed between the combustor swirler shell and the combustion liner, and a spring clip is disposed in this annular clearance.

In the gas turbine combustor of the above-described configuration, compressed air from a compressor is taken into the combustor swirler shell. Meanwhile, part of the compressed air passes through the annular clearance and is supplied into the combustion liner.

Patent Literature 1 discloses a measurement device for measuring the size of a clearance between adjacent ones of shrouds which are mounted respectively at the tips of multiple turbine blades.

Patent Literature 2 discloses a measurement device for measuring the clearance between a heat transfer pipe and a vibration dampening metal piece of a nuclear power plant steam generator.

CITATION LIST

Patent Literature

Patent Literature 1

Japanese Unexamined Patent Application, Publication No. 2009-19590

Patent Literature 2

Japanese Unexamined Patent Application, Publication No. Hei 3-107705

SUMMARY OF INVENTION

Technical Problem

When the size of the annular clearance between the combustor swirler shell and the combustion liner varies depending on the position in the circumferential direction, a variation occurs in the amount of passage of compressed air between a larger portion and a smaller portion of the annular clearance. Accordingly, the combustion condition inside the combustor becomes uneven, which may result in a problem such as combustion oscillation. It is therefore necessary to know the size of the annular clearance between the combustor swirler shell and the combustion liner.

However, in the conventional practice of combustor assembly, a combustor swirler shell with a nozzle assembly is mounted onto a casing after a combustion liner etc. are installed in the casing, so that the annular clearance between the combustor swirler shell and the combustion liner can be measured only after the combustion liner and the combustor swirler shell have been integrated into the casing.

On the other hand, no measurement device is known that is capable of measuring the size of the annular clearance between the combustor swirler shell and the combustion liner in an assembled state of a combustor with the combustor swirler shell and the combustion liner etc. installed.

For example, Patent Literatures 1 and 2 do not at all describe a measurement device or a measurement method for measuring the size of the annular clearance between the combustor swirler shell and the combustion liner.

At least one embodiment of the present invention has been contrived in view of the above-described circumstances, and has an object to provide a clearance measurement device and a clearance measurement method for a combustor which can measure, in an assembled state of a combustor, the size of a clearance between a first cylindrical body surrounding the outer circumference of a combustion nozzle, and a second cylindrical body being connected with the first cylindrical body and guiding combustion gas to a downstream side.

Solution to Problem

A clearance measurement device for a combustor for measuring the size of an annular clearance between a first cylindrical body and a second cylindrical body of a combustor in an overlapping portion of the first cylindrical body and the second cylindrical body, the combustor comprising: a combustion nozzle; the first cylindrical body which is provided surrounding the combustion nozzles; and the second cylindrical body which is connected with the first cylindrical body and guides combustion gas combusted by the combustion nozzle to a downstream side, wherein the clearance measurement device comprises: a rod part with at least the hollow base end side and the leading end side inserted in the combustor, which is mounted on a first flange of the combustor for fixing the combustion nozzle; a support part which is mounted at the leading end of the rod part so as to be rotatable around a rotation axis perpendicular to the axial direction of the rod part; an imaging element which is supported by the support part and images the annular clearance; an operation lever which penetrates the inside of the hollow rod part on the base end side and extends toward the support part; and a link mechanism which is provided between the operation lever and the support part and converts a forward/backward motion of the operation lever into a rotary motion of the support part around the rotation axis.

According to the above-described clearance measurement device for a combustor, since a forward/backward motion of the operation lever is converted through the link mechanism into a rotary motion of the support part, during mounting of the clearance measurement device onto the combustor, the support part can be kept along the axial direction of the rod part, and during clearance measurement, the support part can be rotated so as to direct the imaging element toward the annular clearance. Accordingly, it is possible to smoothly insert the rod part and the support part mounted at the leading end of the rod part into a narrow space inside the combustor, as well as to reliably image the annular clearance with the imaging element. Thus, even with the first cylindrical body and the second cylindrical body assembled, the size of the annular clearance can be calculated on the basis of an image of the annular clearance obtained by the imaging element.

In one embodiment, the clearance measurement device for a combustor further includes a stopper which is provided in the rod part and regulates the maximum rotation angle of the support part, wherein, at the maximum rotation angle, the imaging element supported by the support part is directed toward the annular clearance.

In this way, the imaging element can be directed toward the annular clearance with ease and high accuracy, compared with the case where the position of the imaging element during imaging is adjusted by adjusting the amount of operation of the operation lever and thereby the amount of rotation of the support part.

In one embodiment, the stopper is configured such that the imaging element is positioned on a measurement line, which is a straight line connecting the annular clearance and the rotation axis, in a state where the support part has rotated to the maximum rotation angle.

In this way, since the imaging element is closest to the annular clearance at the maximum rotation angle of the support part, the annular clearance on an image taken can be measured accurately by imaging from this position. Accordingly, the size of the annular clearance can be calculated precisely.

In one embodiment, the clearance measurement device for a combustor further includes a light source, which is mounted on the rod part at a position in the axial direction corresponding to the end of the first cylindrical body on the second cylindrical body side, and radiates light outward in the radial direction, wherein the stopper and the light source are configured such that the annular clearance is formed at an intersection between a radiation direction of the light from the light source and the straight line.

In this way, the shadow of the first cylindrical body can be formed in the annular clearance by radiating light from the light source provided in the rod part toward the annular clearance.

Since the annular clearance is located at a position where the radiation direction of the light source and the straight line connecting the annular clearance and the rotation axis intersect with each other, the shadow formed in the annular clearance can be imaged with the imaging element. Moreover, the size of the actual annular clearance can be calculated by measuring the length of the shadow on an image taken with the imaging element.

Since the light source is mounted on the rod part at a position in the axial direction corresponding to the end of the first cylindrical body on the second cylindrical body side, the end of the first cylindrical body on the second cylindrical body side can be irradiated directly from the lateral side (in the direction perpendicular to the axial direction). The length of the shadow can be matched with the size of the actual annular clearance by irradiating the end of the first cylindrical body on the second cylindrical body side directly from the lateral side, so that the size of the annular clearance can be calculated with good accuracy.

In one embodiment, the support part, the imaging element, the operation lever, and the link mechanism can be rotated integrally with the rod part in the circumferential direction.

In this way, since the rod part, the support part, the imaging element, the operation lever, and the link mechanism can be rotated integrally in the circumferential direction of the rod part, the clearance measurement device can be rotated by rotating the rod part. Thus, the annular clearance can be measured at multiple positions in the circumferential direction.

In one embodiment, the clearance measurement device for a combustor further includes a spacer which is detachably provided between a second flange provided in the rod part and the first flange of the combustor.

In this way, the length of the rod part inserted into the combustor can be adjusted by interposing the detachable spacer between the first flange and the second flange. Thus, the above-described clearance measurement device can also be applied to various types of combustors with different axial lengths from the first flange to the leading end-side end surface of the first cylindrical body.

In one embodiment, the clearance measurement device for a combustor further includes: a fixed plate which is fixed with a fastening bolt on the first flange between the second flange provided in the rod part and the first flange of the combustor, and has a through-hole into which the rod part can be inserted; and a friction plate which is disposed so as to hold the second flange between the fixing plate and the friction plate, and is fastened with the fixed plate by a fastening member to frictionally fix the second flange, wherein the fixed plate is provided with a counterbore hole for receiving the head of the fastening bolt.

Thus, the fixed plate is immovable by being fixed with the fastening bolt on the first flange of the combustor. On the other hand, although the second flange of the rod part is frictionally fixed by being held between the friction plate and the fixed plate, the second flange can slide on the fixed plate when the fastening force applied by the friction plate to the fixed plate is reduced. Meanwhile, the head of the fastening bolt for fixing the fixed plate on the first flange of the combustor is received in the counterbore hole of the fixed plate, so that it does not interfere with the second flange of the rod part. Thus, if necessary, the rod part can be easily rotated with the leading end side of the rod part inserted in the combustor.

For example, when the annular clearance is measured at multiple positions in the circumferential direction, the imaging element can be easily directed toward the next measurement position by rotating the rod part while the fastening force applied by the friction plate to the fixed plate is reduced.

An annular clearance measurement method for a combustor according to at least one embodiment of the present invention is a method for measuring the size of an annular clearance between a first cylindrical body and a second cylindrical body of a combustor in an overlapping portion of the first cylindrical body and the second cylindrical body, the combustor including: a combustion nozzle; the first cylindrical body which is provided surrounding the combustion nozzles; and the second cylindrical body which is connected with the first cylindrical body and guides combustion gas combusted by the combustion nozzle to a downstream side, wherein the method includes: a mounting step of inserting the leading end side of a rod part, which is hollow at least on the base end side, into the combustor and mounting the rod part on a first flange of the combustor; a rotating step of moving forward and backward an operation lever, which penetrates the inside of the hollow rod part on the base end side and extends toward the support part, to thereby rotate the support part, which is connected through a link mechanism with the operation lever and is mounted rotatably at the leading end of the rod part, around a rotation axis of the rod part perpendicular to the axial direction; an imaging step of imaging the annular clearance with the imaging element supported by the support part, with the imaging element having been directed toward the annular clearance in the rotating step; and a calculating step of calculating the size of the actual annular clearance on the basis of an image of the annular clearance obtained in the imaging step.

According to the above-described annular clearance measurement method for a combustor, since a forward/backward motion of the operation lever is converted through the link mechanism into a rotary motion of the support part, during insertion of the clearance measurement device into the combustor, the support part can be kept along the axial direction of the rod part. Accordingly, in the mounting step, the rod part and the support part mounted at the leading end of the rod part can be inserted smoothly into a narrow space inside the combustor. Moreover, since a forward/backward motion of the operation lever is converted into a rotary motion of the support part, the support part can be rotated so as to direct the imaging element toward the annular clearance in the rotating step. Since the imaging element has been directed toward the annular clearance by the rotating step, the annular clearance can be reliably imaged with the imaging element in the imaging step. Thus, even with the first cylindrical body and the second cylindrical body assembled, the size of the annular clearance can be calculated by the calculation step on the basis of an image of the annular clearance obtained by the imaging element.

In one embodiment, the rod part, the support part, the imaging element, the operation lever, and the link mechanism may be rotated integrally in the circumferential direction of the rod part to thereby obtain the size of the annular clearance at multiple positions in the circumferential direction.

Thus, the size of the annular clearance can be calculated at multiple positions in the circumferential direction, since the rod part, the support part, the imaging element, the operation lever, and the link mechanism are integrally rotated by a predetermined angle in the circumferential direction of the rod part.

Advantageous Effects of Invention

According to at least one embodiment of the present invention, it is possible to smoothly insert a rod part and a support part mounted at the leading end of the rod part into a narrow space inside a combustor, as well as to reliably image an annular clearance with an imaging element. Thus, even with a first cylindrical body and a second cylindrical body installed in the combustor, the size of the annular clearance between the first cylindrical body and the second cylindrical body can be calculated on the basis of an image of the annular clearance obtained by the imaging element.

DESCRIPTION OF EMBODIMENTS

In the following, embodiments of the present invention will be described in detail on the basis of the drawings. However, the scope of the present invention is not limited to the following embodiments. The dimensions, materials, and shapes of the components, or their relative arrangement, etc. described in the following embodiments are not intended to limit the scope of the present invention to such examples, but are merely illustrative examples. In the following embodiments, a case will be described where the present invention is applied to a combustor constituting a gas turbine.

(The Configuration of a Combustor)

Figure 1:
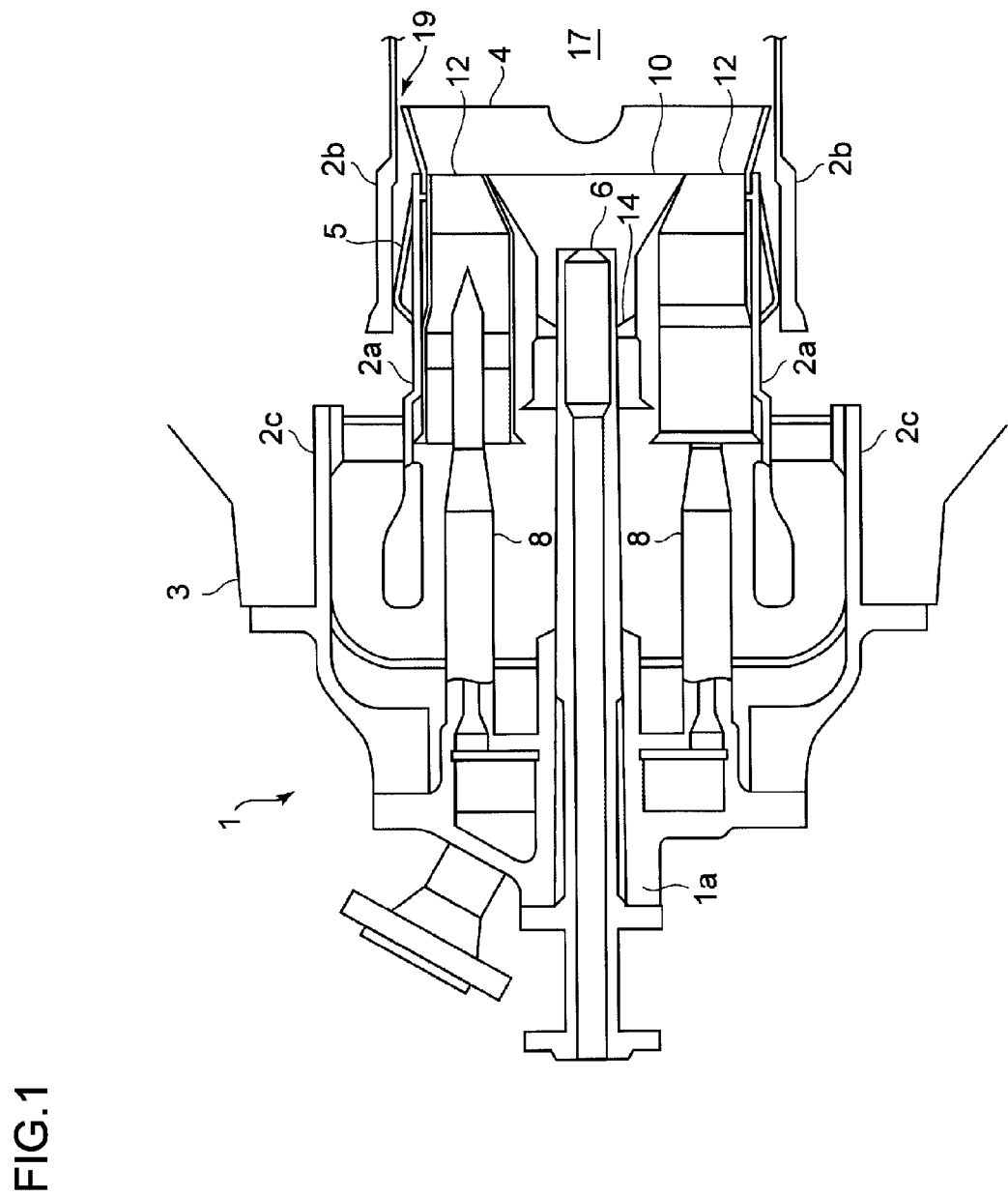
FIG. 1 is a cross-sectional view showing the configuration of a combustor according to an embodiment of the present invention.

FIG. 1 is a cross-sectional view showing the configuration of a combustor according to an embodiment of the present invention.

As shown in FIG. 1, a combustor 1 includes: a combustor swirler shell 2a (corresponding to a first cylindrical body; sometimes called a combustor basket) installed on a fuel supply side; a combustion liner 2b (corresponding to a second cylindrical body; sometimes called a transition piece) which is connected with the combustor swirler shell 2a and guides combustion gas to a downstream gas turbine; and an outer shell 2c which is inserted along an inner wall of a casing 3 and covers the combustor swirler shell 2a. A spring clip 5 is disposed between the combustor swirler shell 2a and the combustion liner 2b in an overlapping portion of the combustor swirler shell 2a and the combustion liner 2b.

The combustor 1 also includes: a pilot nozzle 6 at the center inside the combustor swirler shell 2a which performs diffusion combustion; multiple main nozzles 8 which are disposed at regular intervals on the outer circumference of the pilot nozzle 6 and perform premixed combustion; a pilot cone 10 which is installed so as to cover the downstream-side leading end portion of the pilot nozzle 6; and a main burner 12 which is installed so as to cover the downstream-side leading end portions of the main nozzles 8.

The combustor 1 further includes: a pilot swirler 14 which is installed on the upstream side in the pilot cone 10 so as to butt against the outer circumference of the pilot nozzle 6; and the multiple main nozzles 8 which include a swirler part disposed on the outer circumference of the pilot nozzle 6 on the upstream side in the main burner 12.

Compressed air guided from a compressor constituting the gas turbine to the combustor 1 passes between the combustor swirler shell 2a and the outer shell 2c and is supplied into the combustor swirler shell 2a. Meanwhile, part of the compressed air passes through an annular clearance 19 formed between the combustor swirler shell 2a and the combustion liner 2b and is supplied into the combustion liner 2b.

(The Configuration of a Clearance Measurement Device for the Combustor 1)

Next, a clearance measurement device for the combustor 1 will be described below, which can actually measure the size of the annular clearance 19 between the combustor swirler shell 2a and the combustion liner 2b.

Figure 2:
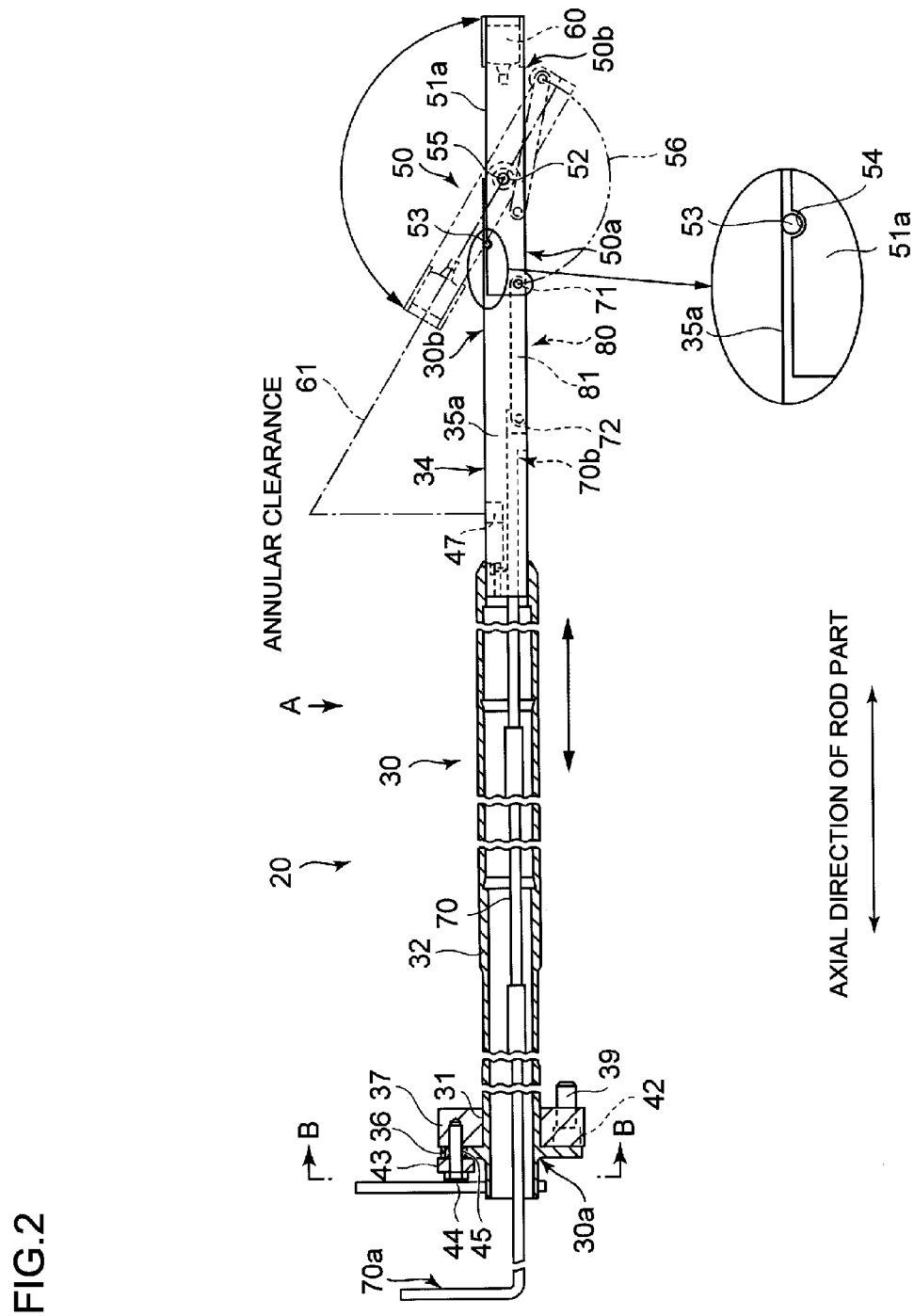
FIG. 2 is a side view showing a clearance measurement device according to an embodiment of the present invention.
Figure 3:
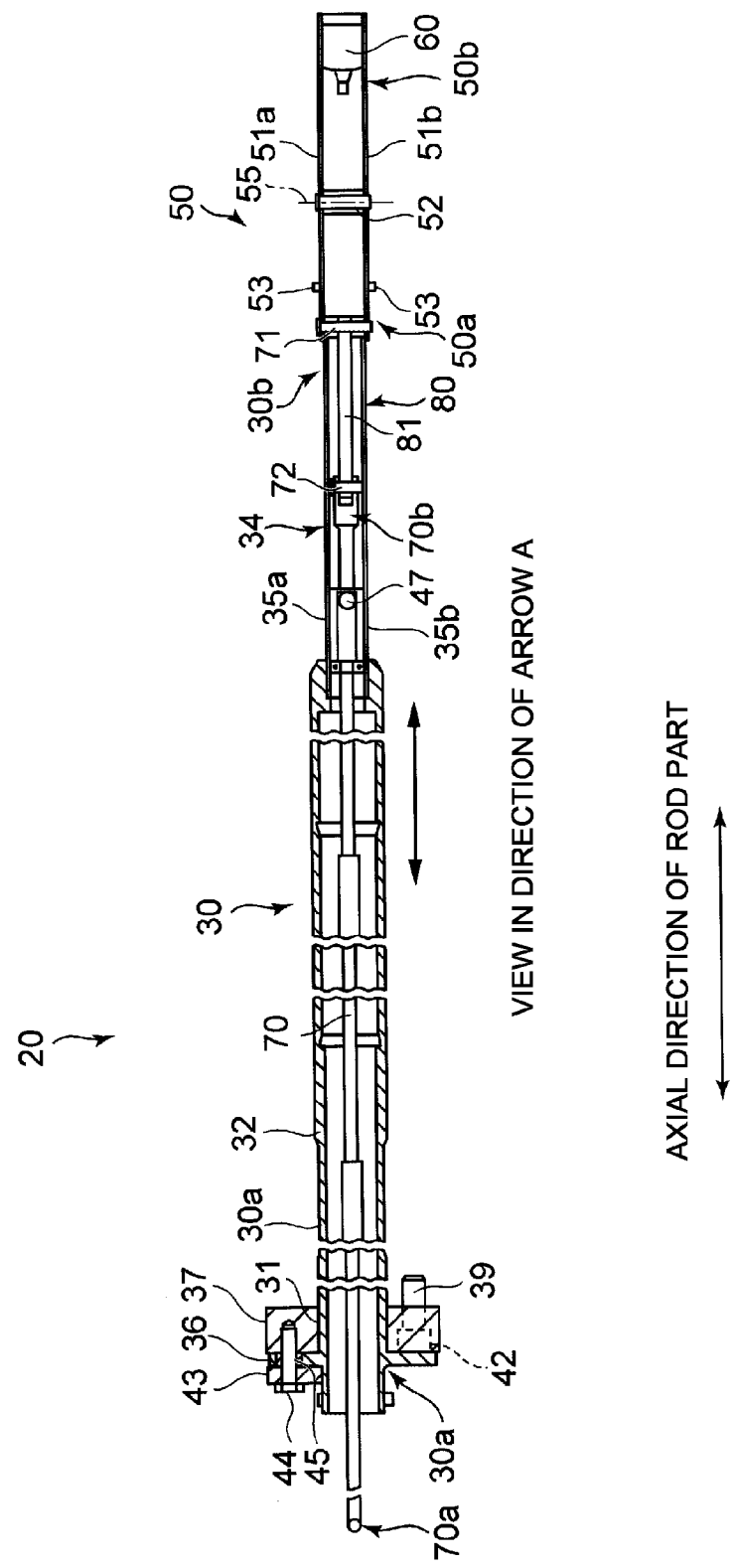
FIG. 3 is a view in the direction of the arrow A of FIG. 2.
Figure 4:
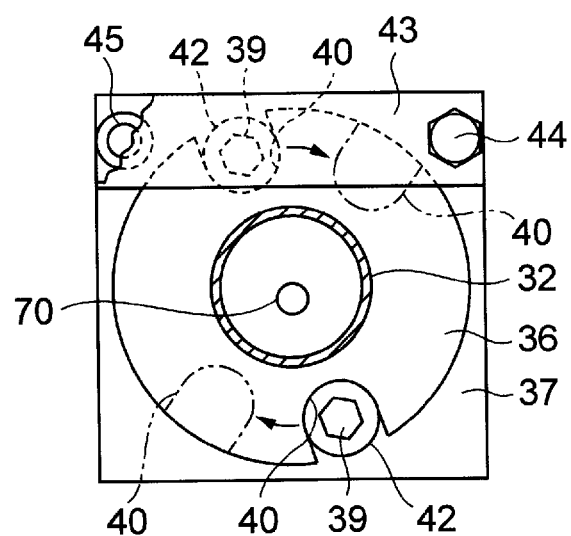
FIG. 4 is a view along the line B-B of FIG. 2.

FIG. 2 is a side view of the clearance measurement device according to an embodiment of the present invention. FIG. 3 is a view in the direction of the arrow A of FIG. 2. FIG. 4 is a view along the line B-B of FIG. 2.

As shown in FIG. 2 to FIG. 4, a clearance measurement device 20 for the combustor 1 includes: a rod part 30; a support part 50 mounted at the leading end of the rod part 30; an imaging element 60 supported at the leading end of the support part 50; an operation lever 70 penetrating the inside of the hollow rod part 30 on the base end side; and a link mechanism 80 provided between the operation lever 70 and the support part 50.

The rod part 30 includes a base end portion 30a and a leading end portion 30b. The base end portion 30a of the rod part 30 is formed of a hollow cylindrical body 32. The leading end portion 30b of the rod part 30 is formed of an arm 34 connected at the leading end of the cylindrical body 32. The arm 34 is formed of a pair of substantially rectangular first plate-like members 35a and 35b. The first plate-like members 35a and 35b are disposed parallel to each other and extend along the axial direction of the rod part 30. The arm 34 is provided with a stopper 53 for regulating the rotation range of the support part 30.

The leading end portion of the arm 34 is coupled with the support part 50 through a coupling pin 52.

The support part 50 includes a pair of substantially rectangular second plate-like members 51a and 51b. The pair of second plate-like members 51a and 51b are disposed so as to hold the arm 34 from both sides. The second plate-like members 51a and 51b are disposed parallel to each other and extend along the axial direction of the rod part 30.

The coupling pin 52 is disposed perpendicular to the axial direction of the rod part 30. Thus, the support part 50 is mounted at the leading end portion 30b of the rod part 30 (at the leading end of the arm 34) so as to be rotatable around an axis (rotation axis) 55 of the coupling pin 52.

The imaging element 60 is disposed at the leading end portion 50b of the support part 50. Specifically, the imaging element 60 is held between the pair of second plate-like members 51a and 51b.

In some embodiments, the imaging element 60 is a CCD image sensor or a CMOS image sensor.

The base end portion 50a of the support part 50 is connected with the link mechanism 80. In some embodiments, the link mechanism 80 is constituted of a rod 81 and a pair of link pins 71 and 72 provided one on each side of the rod 81. The leading end of the rod 81 is coupled with the base end portion 50a of the support part 50 through the first link pin 71. On the other hand, the base end of the rod 81 is coupled with the leading end portion 70b of the operation lever 70 through the second link pin 72.

The operation lever 70 is a bar-like member provided so as to penetrate the inside of the cylindrical body 32 of the rod part 30. Of the operation lever 70, a base end portion 70a positioned opposite to the link mechanism 80 is bent in the direction perpendicular to the axial direction of the rod part 30 so that an operator can grip it easily.

When the operation lever 70 moves forward and backward along the axial direction of the rod part 30, the forward/backward motion of the operation lever 70 is converted through the link mechanism 80 into a rotary motion of the support part 50. The actions of the operation lever 70, the link mechanism 80, and the support part 50 when a forward/backward motion of the operation lever 70 is converted into a rotary motion of the support part 50 will be described below using a specific example.

When the operation lever 70 is moved toward the leading end side with the support part 50 kept along the axial direction of the rod part 30, the rod 81 moves to the right side in FIG. 2 while rotating around the second link pin 72 such that the first link pin 71 moves on a trajectory 56 in the counterclockwise direction. Accordingly, the support part 50 coupled with the link mechanism 80 also rotates around the rotation axis 55 in the counterclockwise direction. When the operation lever 70 is moved toward the leading end side, the upper surface of the base end portion 50a of the support part 50 butts against the stopper 53, so that the rotation of the support part 50 in the clockwise direction is regulated by the stopper 53.

The stopper 53 is provided in each of the first plate-like members 35a and 35b of the arm 34. The stoppers 53 are formed at the upper edge of a side surface of the respective first plate-like members 35a and 35b so as to protrude outward from the side surface.

When the operation lever 70 is moved on toward the leading end side, the upper surface of the leading end portion 50b of the support part 50, which has rotated in the counterclockwise direction, butts against the stopper 53 and stops the rotation. The rotation angle at which the leading end portion 50b of the support part 50 butts against the stopper 53 is the maximum rotation angle of the support part 50.

Once the leading end portion 50b of the support part 50 butts against the stopper 53 and the rotation is regulated, the operation lever 70 cannot be moved further toward the leading end side. That is, the support part 50 can always be rotated to the position where it butts against the stopper 53 (to the maximum rotation angle) by operating the operation lever 70 until it cannot be moved further toward the leading end side. Thus, the support part 50 can be easily rotated to the maximum rotation angle.

When the support part 50 has rotated to the maximum rotation angle, that is, when the leading end portion 50b of the support part 50 butts against the stopper 53, the imaging element 60 is positioned on a straight line connecting the annular clearance 19 and the axis 55.

When the operation lever 70 is moved toward the base end side with the support part 50 having rotated to the maximum rotation angle, the rod 81 moves to the left side in FIG. 2 while rotating around the second link pin 72 such that the first link pin 71 moves on the trajectory 56 in the clockwise direction. The support part 50 also rotates around the axis 55 in the clockwise direction.

If the operation lever 70 is moved on toward the base end side, the base end portion 50a of the support part 50 having rotated butts against the stopper 53.

The upper surface of the base end portion 50a of the support part 50 is provided with a notch 54 corresponding to the stopper 53. When the stopper 53 is received in this notch 54, the longitudinal direction of the support part 50 is parallel to the axial direction of the rod part 30. Even if the support part 50 tries to rotate from this state further in the clockwise direction, the rotation of the support part 50 is regulated by the stopper 53.

Thus, the stopper 53 regulates the rotation range of the support part 50 between the angle at which the longitudinal direction of the support part 50 is parallel to the axial direction of the rod part 30 and the maximum rotation angle.

Once the base end portion 50a of the support part 50 butts against the stopper 53 and the rotation is regulated, the operation lever 70 cannot be moved further toward the base end side.

That is, the support part 50 can be easily rotated to an angular position, at which the longitudinal direction of the support part 50 is parallel to the axial direction of the rod part 30, by operating the operation lever 70 until it cannot be moved further toward the base end side.

The clearance measurement device 20 further includes a light source 47 which is mounted on the rod part 30 and radiates light toward the annular clearance 19. The annular clearance 19 is positioned at an intersection between the radiation direction of the light from the light source 47 and a straight line connecting the annular clearance 19 and the axis 55. The position at which the light source 47 is mounted will be described later in detail.

The support part 50, the imaging element 60, the operation lever 70, and the link mechanism 80 constituting the clearance measurement device 20 can rotate integrally with the rod part 30 in the circumferential direction. That is, when the rod part 30 is rotated, the support part 50, the imaging element 60, the operation lever 70, and the link mechanism 80 rotate along with the rod part 30.

The annular clearance 19 is imaged at each predetermined angle along the circumferential direction of the annular clearance 19.

The following describes the method for rotating the clearance measurement device 20 inserted in the combustor 1 by a predetermined angle along the circumferential direction of the annular clearance 19. First, the method for fixing the clearance measurement device 20 on the combustor 1 will be described, and then the method for rotating the clearance measurement device 20 will be described.

Figure 5:
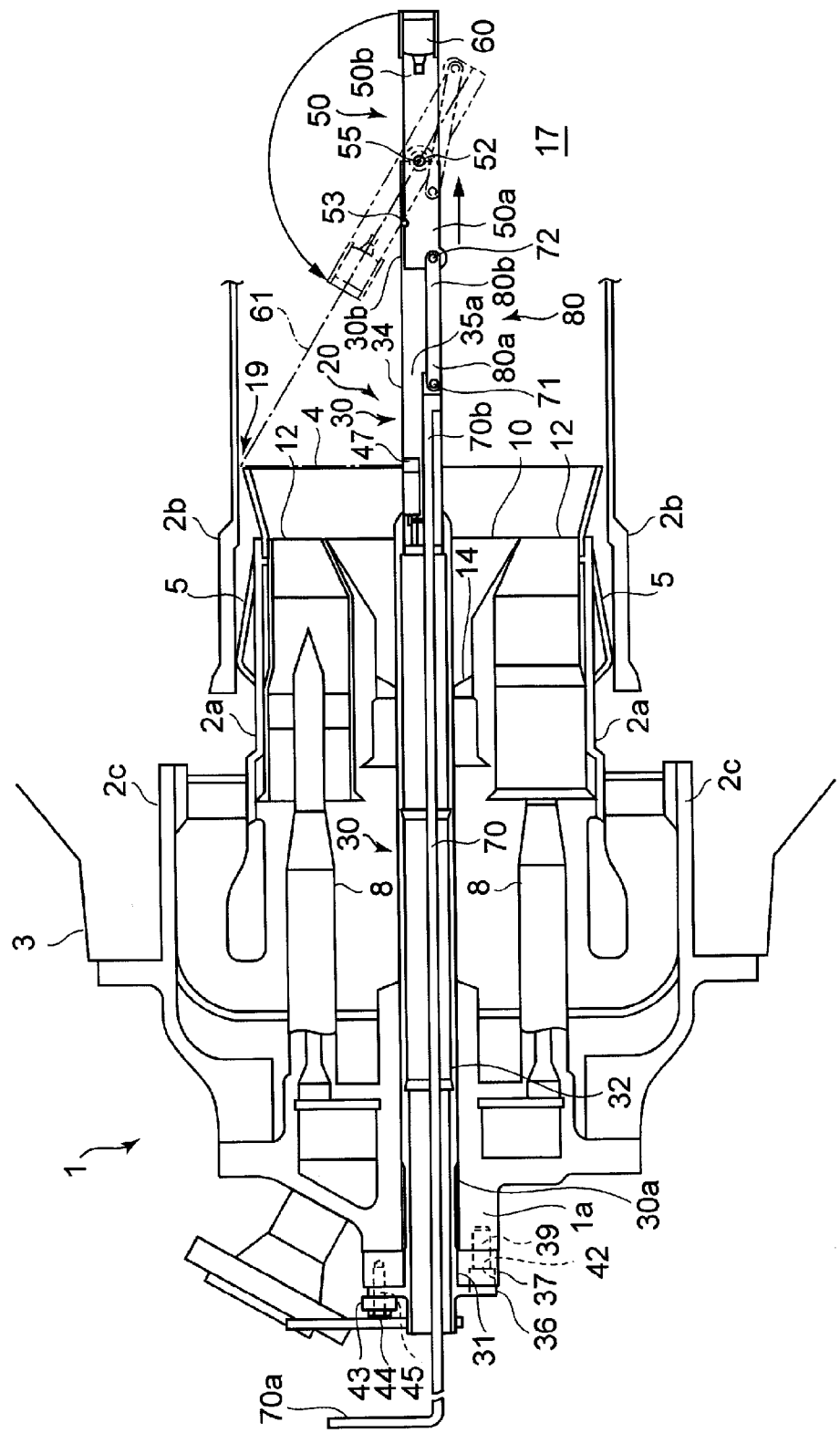
FIG. 5 is a view showing a state where an annular clearance is measured with the clearance measurement device mounted on the combustor.

FIG. 5 is a view showing a state where the annular clearance 19 is measured with the clearance measurement device 20 mounted on the combustor 1.

As shown in FIG. 5, the rod part 30 has, at its base end portion 30a, a second flange 36 to be mounted on a first flange 1a (see FIG. 1) on which the pilot nozzle 6 of the combustor 1 is fixed.

When the clearance measurement device 20 is mounted on the combustor 1, a fixed plate 37 having a through-hole 31, into which the rod part 30 can be inserted, is provided between the second flange 36 and the first flange 1a.

The fixed plate 37 is fixed with a bolt 39 on the first flange 1a. The fixed plate 37 is provided with a counterbore hole 42 so that the head of the bolt 39 does not protrude from the fixed plate 37.

The second flange 36 is provided with a notch 40 (see FIG. 4), into which the bolt 39 can be inserted, in a portion corresponding to the position of the counterbore hole 42.

The bolt 39 is screwed into a screw hole, which is used for mounting the pilot nozzle 6 with a fastening member onto the first flange 1a. Thus, it is not necessary to newly provide the first flange 1a with a screw hole for the bolt 39. Accordingly, decrease in strength of the first flange 1a due to the provision of a screw hole for the bolt 39 can be prevented.

The second flange 36 is held by the fixed plate 37 and a friction plate 43 which is provided on the side opposite to the fixed plate 37 across the second flange 36.

The friction plate 43 is fastened on the fixed plate 37 with hexagonal bolts 44 which penetrate the friction plate 43 at both ends. As the hexagonal bolts 44 at both ends of the friction plate 43 are fastened, the central part of the friction plate 43 butts against the second flange 36 and presses the second flange 36 against the fixed plate 37. Accordingly, a frictional force is generated between the fixed plate 37 and the second flange 36, and this frictional force is used to frictionally fix the second flange 36 on the fixed plate 37. Thus, the rod part 30, namely, the clearance measurement device 20 can be fixed on the combustor 1.

Since excessively fastening the friction plate 43 at both ends with the hexagonal bolts 44 may deform these ends which do not butt against the second flange 36, a ring-shaped spacer 45 into which the hexagonal bolt 44 can be inserted is provided between each end of the friction plate 43 and the fixed plate 37. The thickness of the spacer 45 should be almost equal to the thickness of the second flange 36 in the axial direction.

The screw holes, into which the hexagonal bolts 44 for fastening the friction plate 43 are screwed, are provided in the fixed plate 37. Therefore, the need for providing the first flange 1a with screw holes for the hexagonal bolts 44 for fixing the second flange 36 is eliminated by the provision of the fixed plate 37. Accordingly, decrease in strength of the first flange 1a due to the provision of the screw holes for the hexagonal bolts 44 can be prevented.

When the clearance measurement device 20 is rotated, the hexagonal bolts 44 fixing the friction plate 43 are loosened to reduce the pressing force with which the friction plate 43 presses the second flange 36. Accordingly, the frictional force generated between the second flange 36 and the fixed plate 37 decreases. As the frictional force decreases, the second flange 36, namely, the rod part 30 can be rotated. Meanwhile, the head of the bolt 39 is received in the counterbore hole 42 of the fixed plate 37, so that it does not interfere with the second flange 36 of the rod part 30.

When the rod part 30 is rotated, the support part 50, the imaging element 60, the operation lever 70, and the link mechanism 80 rotate integrally with the rod part 30 in the circumferential direction.

After the rod part has been rotated by a predetermined angle, as described above, the hexagonal bolts 44 at both ends of the friction plate 43 are fastened again to fix the second flange 36 onto the fixed plate 37.

As shown in FIG. 5, the clearance measurement device 20 is mounted on a pilot nozzle mounting part (the first flange 1a) of the combustor 1 in which the main nozzle 8, the combustor swirler shell 2a, the combustion liner 2b, etc. are installed but the pilot nozzle 6 is not installed.

There is no other suitable nozzles than the pilot nozzle 6 as a structure which allows the clearance measurement device 20 to be mounted on the casing 3 for measuring the annular clearance 19 between the combustor swirler shell 2a and the combustion liner 2b. For this reason, the clearance measurement device 20 has such a structure that the support part 50 at the leading end is inserted from the first flange 1a side of the pilot nozzle 6. Moreover, in order to measure the annular clearance 19 between the combustor swirler shell 2a and the combustion liner 2b, it is necessary to dispose the imaging element 60, which is mounted on the support part 50, inside a combustion chamber 17 on the front side of the pilot nozzle 6 (the right side in FIG. 1), farther on the front side than a leading end-side end surface 4 of the combustor swirler shell 2a. Accordingly, it is necessary that the support part 50 equipped with the imaging element 60 has such a structure that it can be reversed to the combustor swirler shell 2a side after the clearance measurement device 20 has been mounted through the pilot nozzle 6.

While use of a high-power element as the imaging element 60 is desirable, a high-power element has a larger element size, so that it cannot be inserted due to interference with the inside of the pilot swirler 14 during mounting of the clearance measurement 20. Therefore, the small-sized imaging element 60 is used so as to avoid interference with the pilot swirler 14 as well as to allow the support part 50 to rotate and reverse. Thus, the distance between the imaging element 60 and the annular clearance 19 is reduced, and a clear image can be obtained even with the small-sized, low-power imaging element 60.

Next, the support part 50 and the leading end portion 30b of the rod part 30 are inserted into the combustor 1, and then the fixed plate 37 is mounted on the first flange 1a. Subsequently, the second flange 36 is pressed against the fixed plate 37 using the friction plate 43, and the second flange 36 is fixed on the combustor 1 through the frictional force. In this way, the clearance measurement device 20 is mounted on the combustor 1.

Next, the operation lever 70 is moved toward the leading end side until it cannot be moved further, to thereby rotate the support part 50 to the maximum rotation angle. Then, the imaging element 60 is positioned on the straight line connecting the annular clearance 19 and the axis 55, and the imaging element 60 is disposed at a position at which the imaging element 60 is closest to the annular clearance 19.

The annular clearance 19 is irradiated by the light source 47 mounted on the rod part 30. The light source 47 is provided at a position in the axial direction of the rod part 30 corresponding to the leading end-side end surface 4 of the combustor swirler shell 2a, and radiates light in a direction perpendicular to the axial direction of the rod part 30. Thus, the shadow of the combustor swirler shell 2a is formed in the annular clearance 19. Since the leading end-side end surface 4 of the combustor swirler shell 2a is irradiated directly from the lateral side, the length of the shadow formed in the annular clearance 19 matches the size of the actual annular clearance.

With the imaging element 60 supported by the support part 50 directed toward the annular clearance 19, the annular clearance 19 irradiated with the light from the light source 47 is imaged by the imaging element 60.

Subsequently, the annular clearance 19 on the image taken by the imaging element 60, namely, the length of the shadow is measured. The size of the actual annular clearance 19 is calculated by substituting the measured value of the size of the annular clearance 19 into a relational expression which represents the relation between the size of the annular clearance 19 on an image and the size of the actual annular clearance 19. The relational expression used which represents the relation between the size of the annular clearance 19 on an image and the size of the actual annular clearance 19 is calculated in advance through experiment etc.

Figure 6:
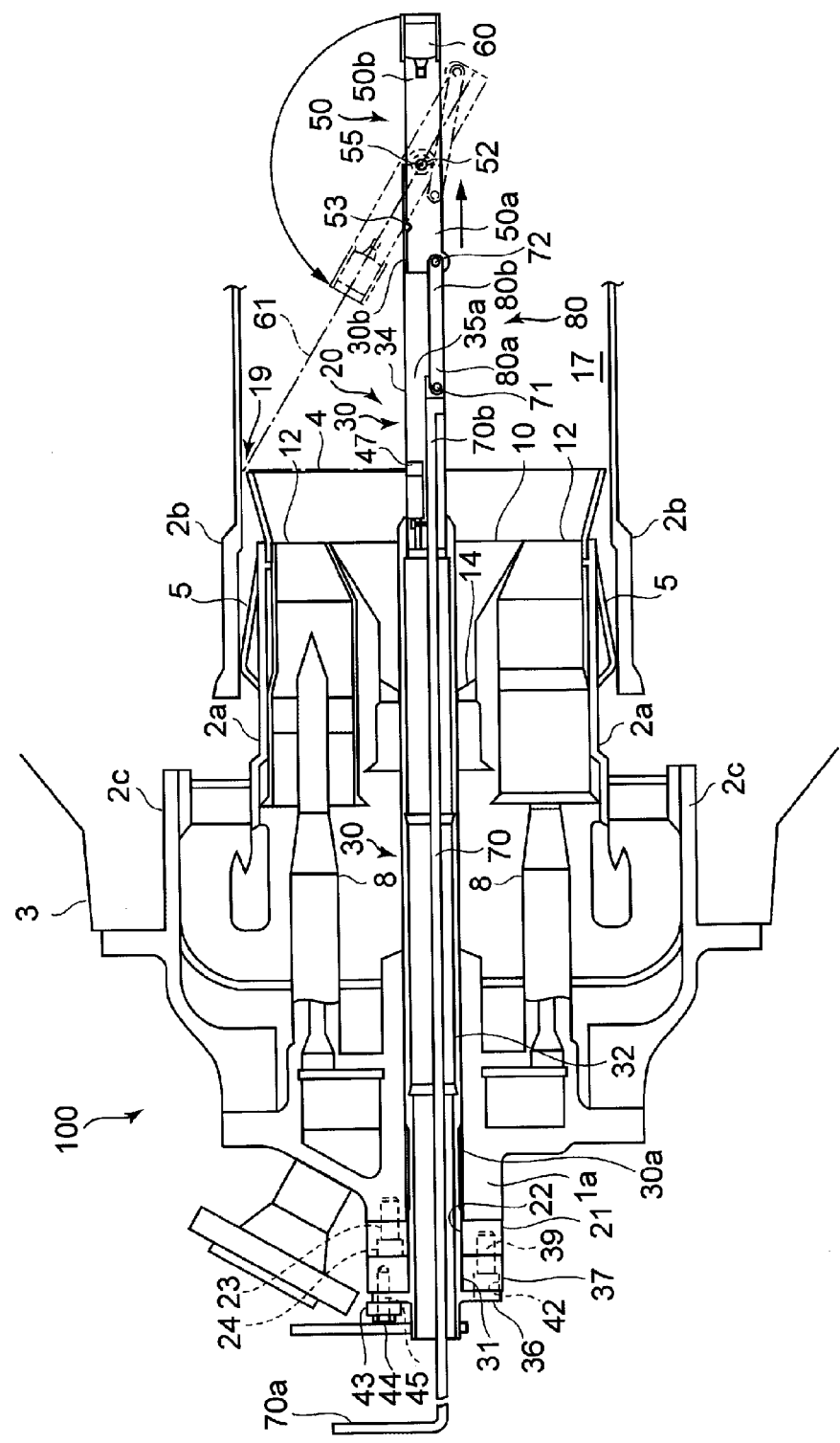
FIG. 6 is a view showing a state where the annular clearance is measured with the clearance measurement device mounted on another type of combustor.

FIG. 6 is a view showing a state where the annular clearance 19 is measured with the clearance measurement device 20 mounted on another type of combustor.

As shown in FIG. 6, when the clearance measurement device 20 is mounted on a combustor 100 which differs from the combustor 1 described in FIG. 5 etc. in the axial length from the first flange 1a to the leading end-side end surface 4 of the combustor swirler shell 2a, the position of the light source 47 is shifted in the axial direction. In this case, a detachable spacer 21 is provided between the fixed plate 37 and the first flange 1a to adjust the position of the light source 47 in the axial direction.

The spacer 21 has a through-hole 22, into which the rod part 30 can be inserted, and a counterbore hole 24 for receiving a bolt 23. The spacer 21 is fixed with the bolt 23 on the first flange 1a. When the spacer 21 is used, the fixed plate 37 is disposed so as to hold the spacer 21 between the first flange 1a and the fixed plate 37.

Described next is the concept of applying light from the light source 47 to the annular clearance 19, measuring the length of the shadow formed with the imaging element 60, and correcting the measured value to the size of the annular clearance 19.

Figure 7:
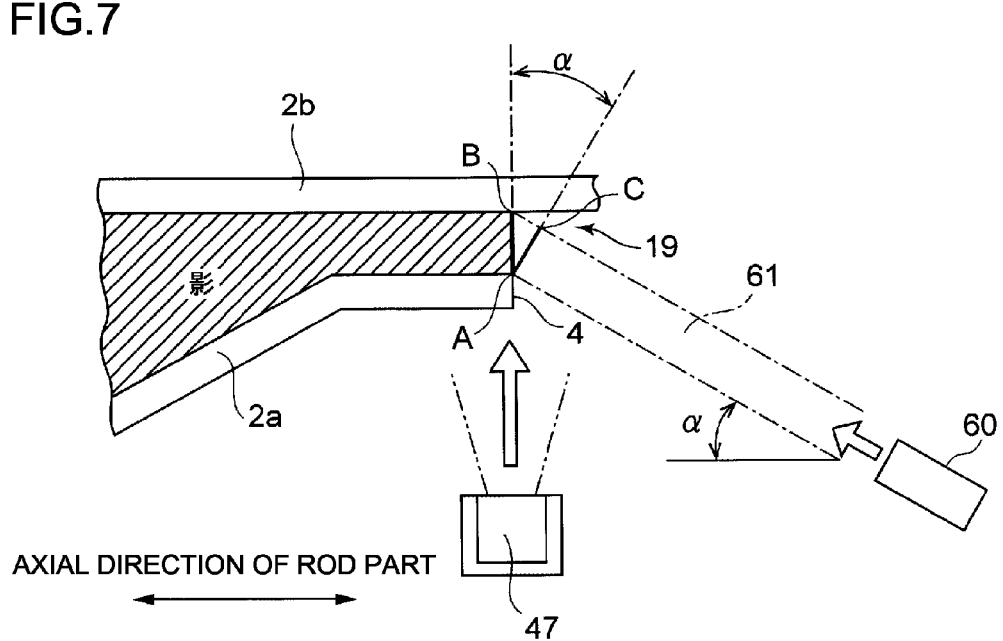
FIG. 7 is a schematic view showing the concept of measurement of the annular clearance.

FIG. 7 is a schematic view showing the concept of measurement of the annular clearance 19.

As shown in FIG. 7, when the light source 47 is disposed such that the center of the light source 47 is aligned with the leading end-side end surface 4 of the combustor swirler shell 2a in the axial direction, and light is applied to the surrounding area of the annular clearance 19 from the direction perpendicular to the axial direction, the light falls on the leading end-side end surface 4 of the combustor swirler shell 2a and the inner surface of the combustion liner 2b. Here, the outer edge in the radial direction of the combustor swirler shell 2a is denoted by a point A, and the intersection between the inner surface of the combustion liner 2b and a line drawn from the point A in the radial direction toward the inner surface of the combustion liner 2b perpendicularly to the axial direction is denoted by a point B. The intersection between a vertical line extending from the point A and a measurement line 61 of the light emitted from the imaging element 60 (measurement line 61) which passes the point B is denoted by a point C. Thus, when the measurement line 61 emitted from the imaging element 60 has an inclination angle α to the axial direction, the angle at which the line segment AB and the line segment AC intersect with each other is equal to the inclination angle α.

In the image captured by the imaging element 60, the point A and the point B are light spots (spots displayed brightly), while the space between the point A and the point B is displayed as a circumferentially dark annular zone. That is, in FIG. 8, the size of the annular clearance 19 can be considered as the length of the line segment AB. However, since the length of the annular clearance 19 displayed on an image is displayed as the length of the line segment AC, it is necessary to correct the measured value by substituting the line segment AC with the line segment AB. The relation is determined by calculating the relational expression through a previous test (step S1) to be described later.

(The Flow of Calculating the Size of the Annular Clearance 19)

Next, the flow of calculating the size of the annular clearance 19 with the clearance measurement device 20 will be described.

Figure 8:
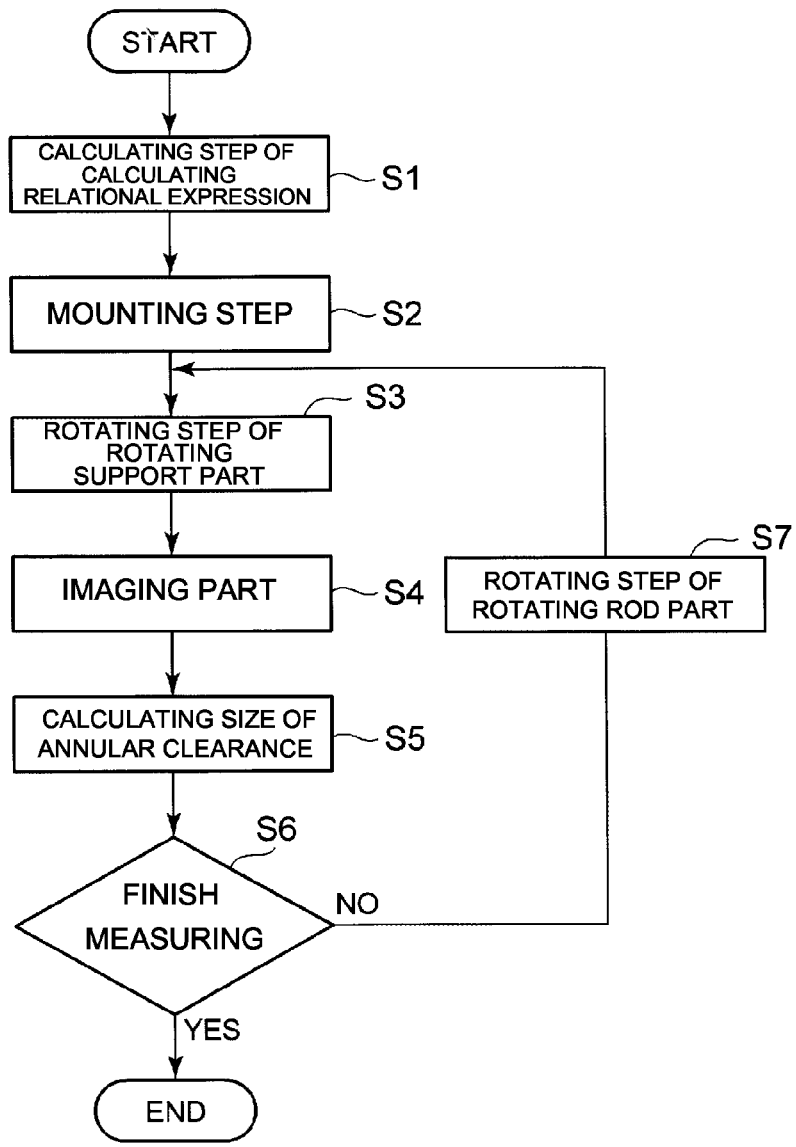
FIG. 8 is a view showing the flow of measuring the annular clearance with the clearance measurement device.

FIG. 8 is a view showing the flow of calculating the annular clearance 19 with the clearance measurement device 20.

First, as shown in FIG. 8, before the clearance measurement device 20 is inserted into the combustor 1, the relational expression representing the relation between the annular clearance of a known length and the size of the annular clearance on an image taken is calculated (step S1).

Specifically, a test light source 47, a test imaging element 60, and a test clearance are provided, and these test light source 47, test imaging element 60, and test clearance are disposed such that their positional relation is the same as the positional relation of the light source 47, the imaging element 60, and the annular clearance 19 in a state where the clearance measurement device 20 is mounted on the combustor 1. That is, the test light source 47, the test imaging element 60, and the test clearance are disposed such that the test clearance is positioned at the intersection (the point A and the point B) between the radiation direction of the light from the test light source 47 and the measurement line 61 which is a straight line connecting the test clearance and the test imaging element 60. The size of the test clearance is measured with an instrument such as a caliper.

Then, light is radiated from the test light source 47 toward the test clearance, and the test clearance is imaged with the test imaging element 60. Subsequently, the length of the shadow (the line segment AC) on the image taken by the test imaging element 60 is measured, and the relational expression representing the relation between the measured length of the shadow on the image and the size of the actual test clearance (the line segment AB) is calculated.

Next, the operation lever 70 of the clearance measurement device 20 is moved toward the base end side to thereby rotate the support part 50 and keep the support part 50 along the axial direction of the rod part 30.

Next, the main nozzle 8, the combustor swirler shell 2a, and the combustion liner 2b are installed in the combustor 1, and the clearance measurement device 20 is mounted by insertion on the pilot nozzle mounting part on which the pilot nozzle 6 is not installed (step S2).

The support part 50 and the rod part 30 of the clearance measurement device 20 are inserted into the combustor 1 with the support part 50 kept along the axial direction of the rod part 30. Subsequently, the clearance measurement device 20 is mounted on the combustor 1 by fixing the fixed plate 37 on the first flange 1a and fixing the second flange 36 through the friction plate 43 on the fixed plate 37.

Next, the operation lever 70 is moved toward the leading end side to thereby rotate the support part 50 (step S3).

The operation lever 70 is moved toward the leading end side until the leading end portion 50b of the support part 50 butts against the stopper 53, and the imaging element 60 is directed toward the annular clearance 19. Once the operation lever 70 cannot be moved further toward the leading end side, the operation lever 70 is retained at that position. Then, the support part 50 has been rotated to the maximum rotation angle.

Next, with the imaging element 60 directed toward the annular clearance 19, the annular clearance 19 is imaged by the imaging element 60 (step S4).

Next, the size of the actual annular clearance 19 is calculated on the basis of the size of the annular clearance 19 on the image taken in step S4 (step S5).

The annular clearance 19 on the image taken in step S4, namely, the length of the shadow is measured. The measured size of the annular clearance 19 is substituted into the relational expression calculated in step S1 to thereby calculate the size of the actual annular clearance 19.

Next, it is determined whether or not the measurement of the annular clearance 19 is finished (step S6).

It is determined whether the annular clearance 19 has been imaged a preset predetermined number of times or more at different angles in the circumferential direction of the annular clearance 19. If the number of times the annular clearance 19 has been imaged is smaller than the preset predetermined number of times (step S6: NO), step S7 is performed subsequently.

In step S7, the hexagonal bolts 44 of the friction plate 43 are loosened to reduce the frictional force generated between the second flange 36 and the fixed plate 37. Then, the second flange 36 is rotated by a predetermined angle in the circumferential direction to thereby rotate the rod part 30. The support part 50, the imaging element 60, the operation lever 70, and the link mechanism 80 rotate integrally with the rod part 30. In this way, the clearance measurement device 20 can be rotated.

Subsequently, the clearance measurement device 20 is fixed on the combustor 1 by fastening the hexagonal bolts 44 and fixing the second flange 36 on the fixed plate 37.

Thereafter, step S3 is performed again.

On the other hand, if the number of times the annular clearance 19 has been imaged is equal to or larger than the preset predetermined number of times (step 6: YES), the measurement work is finished.

According to the above-described clearance measurement device 20 for the combustor 1 related to this embodiment, since a forward/backward motion of the operation lever 70 is converted through the link mechanism 80 into a rotary motion of the support part 50, during mounting of the clearance measurement device 20 onto the combustor 1, the support part 50 can be kept along the axial direction of the rod part 30, and during clearance measurement, the support part 50 can be rotated so as to direct the imaging element 60 toward the annular clearance 19. Thus, it is possible to smoothly insert the rod part 30 and the support part 50 mounted at the leading end of the rod part 30 into a narrow space inside the combustor 1, as well as to reliably image the annular clearance 19 with the imaging element 60. Therefore, even with the combustor swirler shell 2a and the combustion liner 2b assembled, the size of the annular clearance 19 can be calculated on the basis of the image of the annular clearance 19 obtained by the imaging element 60.

Moreover, since the stoppers 53 for regulating the maximum rotation angle of the support part 50 are provided, the imaging element 60 can be directed toward the annular clearance 19 with ease and high accuracy, compared with the case where the position of the imaging element during imaging is adjusted by adjusting the amount of operation of the operation lever 70 and thereby the amount of rotation of the support part 50.

When the leading end portion 50b of the support part 50 butts against the stopper 53, the imaging element 60 is positioned on the measurement line 61 which is a straight line connecting the annular clearance 19 and the axis 55. Since the imaging element 60 is then closest to the annular clearance 19, the annular clearance 19 on an image taken can be measured with good accuracy by imaging from this position. Accordingly, the size of the annular clearance 19 can be calculated precisely.

Since the light source 47 is mounted on the rod part 30 at a position in the axial direction corresponding to the leading end-side end surface 4 of the combustor swirler shell 2a, the end of the combustor swirler shell 2a can be irradiated directly from the lateral side (in the direction perpendicular to the axial direction of the rod part 30). The length of the shadow can be matched with the size of the actual annular clearance 19 by irradiating the end of the combustor swirler shell 2a directly from the lateral side, so that the size of the annular clearance 19 can be calculated with good accuracy.

Since the rod part 30, the support part 50, the imaging element 60, the operation lever 70, and the link mechanism 80 can be rotated integrally in the circumferential direction of the rod part 30, the annular clearance 19 can be measured at multiple positions in the circumferential direction.

The length of the rod part 30 to be inserted into the combustor 1 can be adjusted by interposing the detachable spacer 21 between the first flange 1a and the second flange 36. Thus, the clearance measurement device 20 of the present invention can also be applied to various types of combustors with different axial lengths from the first flange 1a to the leading end-side end surface 4 of the combustor swirler shell 2a.

The fixed plate 37 is immovable by being fixed with the bolt 39 on the first flange 1a. On the other hand, although the second flange 36 of the rod part 30 is frictionally fixed by being held between the friction plate 43 and the fixed plate 37, the second flange 36 can slide on the fixed plate 37 when the fastening force applied by the friction plate 43 to the fixed plate 37 is reduced. Meanwhile, the head of the fastening bolt 39 for fixing the fixed plate 37 on the first flange 1a of the combustor 1 is received in the counterbore hole 42 of the fixed plate 37, so that it does not interfere with the second flange 36 of the rod part 30. Thus, if necessary, the rod part 30 can be easily rotated with the leading end side of the rod part 30 inserted in the combustor 1.

For example, when the annular clearance 19 is measured at multiple positions in the circumferential direction, the imaging element 60 can be easily directed toward the next measurement position by rotating the rod part 30 while the fastening force applied by the friction plate 43 to the fixed plate 37 is reduced.

In this embodiment, the case has been described where the annular clearance 19 is imaged using a CCD image sensor or a CMOS image sensor as the imaging element 60; however, the present invention is not limited to this example, and other imaging devices may be used.

In this embodiment, the case has been described where the light source 47 is provided on the rod part 30; however, the present invention is not limited to this example, and the imaging element 60 may be equipped with the light source 47.

REFERENCE SIGNS LIST 1 combustor
1a first flange
2a combustor swirler shell
2b combustion liner
2c outer shell
3 casing
4 leading end-side end surface
5 spring clip
6 pilot nozzle
8 main nozzle
10 pilot cone
12 main burner
14 pilot swirler
17 combustion chamber
19 annular clearance
20 clearance measurement device
21 spacer
22 through-hole
23 bolt
24 counterbore hole
30 rod part
30a base end portion
30b leading end portion
31 through-hole
32 cylindrical body
34 arm
35a, 35b first plate-like member
36 second flange
37 fixed plate
39 bolt
40 notch
42 counterbore hole
43 friction plate
44 hexagonal bolt
45 spacer
47 light source
50 support part
50a base end portion
50b leading end portion
51a, 51b second plate-like member
52 coupling pin
53 stopper
54 notch
55 axis
56 trajectory
60 imaging element
61 measurement line
70 operation lever
70a base end portion
70b leading end portion
71 first link pin
72 second link pin
80 link mechanism
80a base end portion
80b leading end portion
100 combustor

The invention claimed is:

1. A clearance measurement device for a combustor for measuring the size of an annular clearance between a first cylindrical body and a second cylindrical body of a combustor in an overlapping portion of the first cylindrical body and the second cylindrical body, the combustor comprising: a combustion nozzle; the first cylindrical body which is provided surrounding the combustion nozzles; and the second cylindrical body which is connected with the first cylindrical body and guides combustion gas combusted by the combustion nozzle to a downstream side, wherein
the clearance measurement device comprises:
a rod part with at least the hollowed base end side and the leading end side inserted in the combustor, which is mounted on a first flange of the combustor for fixing the combustion nozzle;
a support part which is mounted at the leading end of the rod part so as to be rotatable around a rotation axis perpendicular to the axial direction of the rod part;
an imaging element which is supported by the support part and images the annular clearance;
an operation lever which penetrates the inside of the hollow rod part on the base end side and extends toward the support part; and
a link mechanism which is provided between the operation lever and the support part and converts a forward/backward motion of the operation lever into a rotary motion of the support part around the rotation axis.

2. The clearance measurement device for a combustor according to claim 1, further comprising a stopper which is provided in the rod part and regulates the maximum rotation angle of the support part, wherein
at the maximum rotation angle, the imaging element supported by the support part is directed toward the annular clearance.

3. The clearance measurement device for a combustor according to claim 2, wherein the stopper is configured such that the imaging element is positioned on a straight line connecting the annular clearance and the rotation axis, in a state where the support part has rotated to the maximum rotation angle.

4. The clearance measurement device for a combustor according to claim 3, further comprising a light source, which is mounted on the rod part at a position in the axial direction corresponding to the end of the first cylindrical body on the second cylindrical body side, and radiates light outward in the radial direction, wherein
the stopper and the light source are configured such that the annular clearance is formed at the intersection between a radiation direction of the light from the light source and the straight line.

5. The clearance measurement device for a combustor according to claim 1, wherein the support part, the imaging element, the operation lever, and the link mechanism can be rotated integrally with the rod part in the circumferential direction.

6. The clearance measurement device for a combustor according to claim 1, further comprising a spacer which is detachably provided between a second flange provided in the rod part and the first flange of the combustor.

7. The clearance measurement device for a combustor according to claim 1, further comprising:
- a fixed plate which is fixed with a fastening bolt on the first flange between the second flange provided in the rod part and the first flange of the combustor, and has a through-hole into which the rod part can be inserted; and
- a friction plate which is disposed so as to hold the second flange between the fixing plate and the friction plate, and is fastened with the fixed plate by a fastening member to frictionally fix the second flange, wherein the fixed plate is provided with a counterbore hole for receiving the head of the fastening bolt.

8. An annular clearance measurement method for a combustor for measuring the size of an annular clearance between a first cylindrical body and a second cylindrical body of a combustor in an overlapping portion of the first cylindrical body and the second cylindrical body, the combustor comprising: a combustion nozzle; the first cylindrical body which is provided around the combustion nozzle and surrounding the combustion nozzles; and the second cylindrical body which is connected with the first cylindrical body and guides combustion gas combusted by the combustion nozzle to a downstream side, wherein
the annular clearance measurement method comprises:
- a mounting step of inserting the leading end side of a rod part, which is hollow at least on the base end side, into the combustor and mounting the rod part on a first flange of the combustor;
- a rotating step of moving forward and backward an operation lever, which penetrates the inside of the hollow rod part on the base end side and extends toward a support part, to thereby rotate the support part, which is connected through a link mechanism with the operation lever and is mounted rotatably at the leading end of the rod part, around a rotation axis of the rod part perpendicular to the axial direction;
- an imaging step of imaging the annular clearance with the imaging element supported by the support part, with the imaging element having been directed toward the annular clearance in the rotating step; and
- a calculating step of calculating the size of the actual annular clearance on the basis of an image of the annular clearance obtained in the imaging step.

9. The annular clearance measurement method for a combustor according to claim 8, wherein the rod part, the support part, the imaging element, the operation lever, and the link mechanism are rotated integrally in the circumferential direction of the rod part to thereby obtain the size of the annular clearance at multiple positions in the circumferential direction.

* * * * *